(12) United States Patent
Walton et al.

(10) Patent No.: US 6,883,072 B2
(45) Date of Patent: *Apr. 19, 2005

(54) MEMORY SYSTEM AND METHOD OF USING SAME

(75) Inventors: John K. Walton, Mendon, MA (US); Christopher S. MacLellan, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 10/408,383

(22) Filed: Apr. 7, 2003

(65) Prior Publication Data

US 2004/0030848 A1 Feb. 12, 2004

Related U.S. Application Data

(62) Division of application No. 09/950,546, filed on Sep. 11, 2001, now Pat. No. 6,594,739.

(51) Int. Cl.$^7$ ............................................. G06F 12/00
(52) U.S. Cl. ..................................... 711/155; 711/220
(58) Field of Search ............................. 711/155, 218, 711/220

(56) References Cited

U.S. PATENT DOCUMENTS

| | | | | |
|---|---|---|---|---|
| 4,794,521 A | * | 12/1988 | Ziegler et al. | 711/130 |
| 5,553,263 A | * | 9/1996 | Kalish et al. | 711/127 |
| 5,754,819 A | * | 5/1998 | Lynch et al. | 711/218 |

* cited by examiner

*Primary Examiner*—Nasser Moazzami
(74) *Attorney, Agent, or Firm*—Penelope S. Wilson; John M. Gunther

(57) ABSTRACT

A memory system and method of using same are provided. In one embodiment of the present invention, the memory system may include a plurality of logic sections that may be used to facilitate execution of relatively complex atomic read-modify-write operations.

8 Claims, 9 Drawing Sheets

MEMORY SYSTEM AND METHOD OF USING SAME

This application is a division of application Ser. No. 09/950,546 filed Sep. 11, 2001, now U.S. Pat. No. 6,594,739.

FIELD OF THE INVENTION

The present invention relates to a memory system (and method of using same) wherein relatively complex operations may be performed.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the trade name Symmetrix™ (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back end" controllers/directors) that store user data in, and retrieve user data from a shared cache memory resource in the subsystem. A plurality of host controllers (commonly referred to as "front end" controllers/directors) may also store user data in, and retrieve user data from, the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., Small Computer Systems Interface (SCSI), Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments.

Computer programs may include instruction loops comprising respective sets of instructions that may be repetitively executed in a plurality of respective iterations. The execution of an iteration of a set of loop instructions may be conditioned upon whether a respective control variable value (e.g., a loop counter value) stored in the cache memory resource satisfies one or more predetermined arithmetic and/or logical relationships involving that value. Additionally, each time a determination is made as to whether to execute an iteration of a set of loop instructions, it is typically necessary to change (e.g., increment/decrement) the stored value of the associated control variable.

When a determination is to be made as to whether such a control variable value satisfies an associated predetermined relationship, a set of related operations (hereinafter termed "the related operations") may be performed in the Assignee's conventional storage system. The set of related operations may include (1) retrieving (e.g., to a host or disk controller) from the cache memory system the value of that control variable that is presently stored in the cache memory resource (hereinafter termed "the present control variable value"), (2) performing one or more arithmetic and/or logical calculations using the retrieved control variable value for the purpose of determining whether the present control variable value satisfies the associated predetermined relationship, and (3) overwriting the present control variable value stored in the cache memory resource with an updated control variable value.

The cache memory resource in the Assignee's conventional storage system is configured to carry out relatively simple read-modify-write operations, based upon commands received from a host or disk controller, that may be used to facilitate at least some of these related operations. For example, the cache memory resource may be configured to perform a read-modify-write operation that may increment or decrement the present control variable value to generate the updated control variable value, and may overwrite the present control variable value stored in the cache memory resource with the updated control variable value. Other examples of such relatively simple read-modify-write operations may read a first data value from the cache memory resource, perform a logical XOR, AND, or OR of the first data value with a second data value supplied from a host/disk controller, and store the results thereof in the memory location from which the first data value was read.

It would be desirable to enhance the utility, versatility, and effectiveness of the cache memory resource by providing in the cache memory resource means for carrying out one or more improved read-modify-write operations that involve relatively more complex arithmetic and/or logical operations than those that may be performed by the cache memory resource in the Assignee's conventional storage system. It would also be desirable to minimize the number of cache memory resource data transfer cycles (and also, therefore, the time) required to carry out these improved read-modify-write operations.

SUMMARY OF THE INVENTION

In accordance with the present invention, a memory system and method of using same are provided, wherein means are provided for carrying out one or more improved read-modify-write operations, executed atomically, that involve arithmetic and/or logical operations of greater complexity than those that may be carried out in the aforesaid prior art. The memory system of the present invention may be a shared cache memory resource that may include at least one memory region that may store data, and at least one logic section. The at least one logic section may be used to facilitate the execution of the one or more respective atomic read-modify-write memory operations during one or more respective data transfer cycles of the memory system.

In one embodiment of the present invention, the at least one logic section may include a plurality of different types of logic sections, and the at least one memory region may include a plurality of memory regions. Each of these logic sections may be used independently to facilitate the execution of a respective atomic read-modify-write memory operation during a respective data transfer cycle, and may be associated with a respective one of the plurality of memory regions.

The memory system may include one or more electrical circuit boards, and the memory regions and the logic sections may be comprised in the one or more electrical circuit boards. The different types of logic sections that may be comprised in the memory system according to this embodiment of present invention are described more fully below.

A first type of logic section (hereinafter termed "the first logic section") may be used to facilitate the respective execution, during a respective data transfer cycle of the memory system, of a first type of atomic read-modify-write operation that may perform an addition operation that sums together a first complete data word, read from a memory region with which the first logic section is associated, and a second complete data word from an external device (e.g., an I/O controller, such as a host/disk controller). The first complete data word may be retrieved from this memory region and may be received by the first logic section during this respective data transfer cycle; the second complete data word also may be received by the first logic section from the external device during the respective data transfer cycle. The respective first type of atomic read-modify-write operation also may include transmitting to the external device the first complete data word.

A second type of logic section (hereinafter termed "the second logic section") may be used to facilitate the execution, during a respective data transfer cycle of the memory system, of a respective second type of atomic read-modify-write operation that may perform a plurality of arithmetic operations involving portions of a respective first data word, read from a memory region with which the second logic section is associated, and portions of a respective second data word from the external device (i.e., host/disk controller). The portions of the respective first data word may be retrieved from this memory region and also may be received by the second logic section during this respective data transfer cycle; the portions of the respective second data word may be received by the second logic section from the external device during this respective data transfer cycle. The respective second type of atomic read-modify-write operation may also include transmitting to the external device the first data word.

In the second logic section, the arithmetic operations may comprise a first addition operation and a second addition operation. The first addition operation may add a low order portion of the respective first data word to a low order portion of the respective second data word. The second addition operation may add a remaining portion of the respective first data word to a remaining portion of the respective second data word.

In a third type of logic section (hereinafter termed "the third logic section") whose operating principles are similar to those of the second logic section, the respective first and second data words may each comprise respective bytes, where may be a positive integer. The arithmetic operations may comprise addition operations and each of the N addition operations may add one respective byte from the respective first data word to another respective byte from the respective second data word. The one respective byte and the other respective byte may have respective corresponding orders.

In a fourth type of logic section (hereinafter termed "the fourth logic section") whose operating principles may be similar to those of the second logic section, the respective first and second data words may each comprise respective double-bytes (i.e., 16-bit terms), where may be a positive integer. Each double-byte may have two respective bytes, and the arithmetic operations may comprise addition operations. Each of these addition operations may add one respective double-byte from the respective first data word to another respective double-byte from the respective second data word. The one respective double-byte and the other respective double-byte may have respective corresponding orders.

A fifth type of logic section hereinafter termed "the fifth logic section") may be used to facilitate the execution, during a respective data transfer cycle of the memory system, of an additional type of atomic read-modify-write operation that may involve a respective first data word, a respective second data word, a respective third data word, and a respective fourth data word. The respective first data word may be from a location in a memory region with which the fifth logic section may be associated. The respective second data word may be from the external device (i.e., host/disk controller). The respective first data word may be retrieved from the memory region, and may be received by the third logic section during the respective data transfer cycle; the respective second data word may be received by the third logic section from the external device during the respective data transfer cycle.

This additional type of atomic read-modify-write operation may also comprise transmitting to the external device the respective first data word, and comparing the respective third data word to the respective fourth data word. If the respective third data word matches the respective fourth data word, this additional type of atomic read-modify-write operation also may include storing in the memory location from which the respective first data word was retrieved one or more selected portions of the respective second data word.

The fifth logic section may include masking logic that may be used to select these one or more selected portions of the respective second data word. The masking logic may comprise a first AND logic section that may receive the respective second data word and a respective fifth data word. The fifth data word may be supplied from the external device. The masking logic may also comprise a second AND logic section that may receive the respective first data word and an inversion of the respective fifth data word, and an OR logic section that may receive respective outputs from the first and second AND logic sections.

In the fifth logic section, the respective third data word may be generated by a third AND logic section that may receive the respective first data word and a comparison mask. Also in the fifth logic section, the respective fourth data word may be generated by a fourth AND logic section that may receive a comparison data word and the comparison mask.

Advantageously, the improved read-modify-write operations provided in accordance with the present invention permit the utility, versatility, and effectiveness of the memory system of the present invention to be enhanced compared to the prior art. Also advantageously, each improved read-modify-write operation according to the present invention may be carried out in a single respective data transfer cycle, and thus, the number of data transfer cycles (and also, therefore, the time) required to carry out each such operation may be minimized.

These and other features and advantages of the present invention, and various embodiments thereof, will become apparent as the following Detailed Description proceeds and upon reference to the Figures of the drawings, wherein like numerals depict like parts, and in which:

Although the following Detailed Description will proceed with reference being made to illustrative embodiments and methods of use of the present invention, it should be understood that it is not intended that the present invention be limited to these illustrative embodiments and methods of use. On the contrary, many alternatives, modifications, and equivalents of these illustrative embodiments and methods of use will be apparent to those skilled in the art. For example, although the subject invention will be described as being used to advantage in a cache memory system in a network data storage subsystem, the subject invention may be advantageously used in other types of memory systems. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
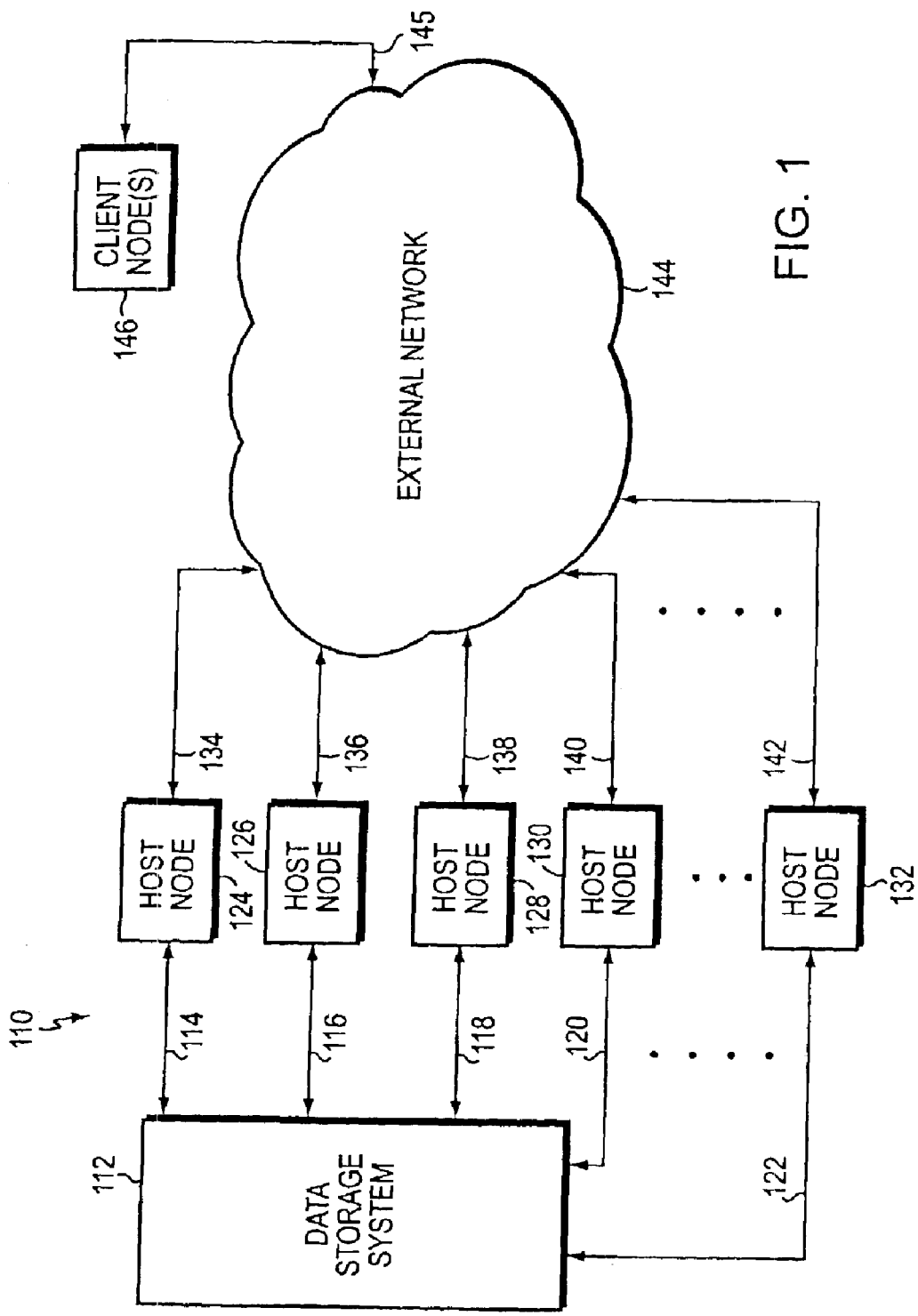
FIG. 1 is a high-level schematic block diagram of a data storage network that includes a data storage system wherein one embodiment of the present invention may be practiced to advantage.

Turning now to the Figures of the drawings, illustrative embodiments of the present invention will be described. FIG. 1 is a high-level block diagram illustrating a data storage network 110 that includes a data storage system 112 wherein one embodiment of the subject invention may be practiced to advantage. System 112 is coupled via communication links 114, 116, 118, 120, . . . 122 to respective host computer nodes 124, 126, 128, 130, . . . 132. Each of the communication links 114, 116, 118, 120, . . . 122 may be configured for communications involving a respective conventional network communication protocol (e.g., FC, ESCON, SCSI, Fibre Connectivity, etc.). Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well-known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the communication links 114, 116, 118, 120, . . . 122, in the manner that will be described below.

Figure 2:
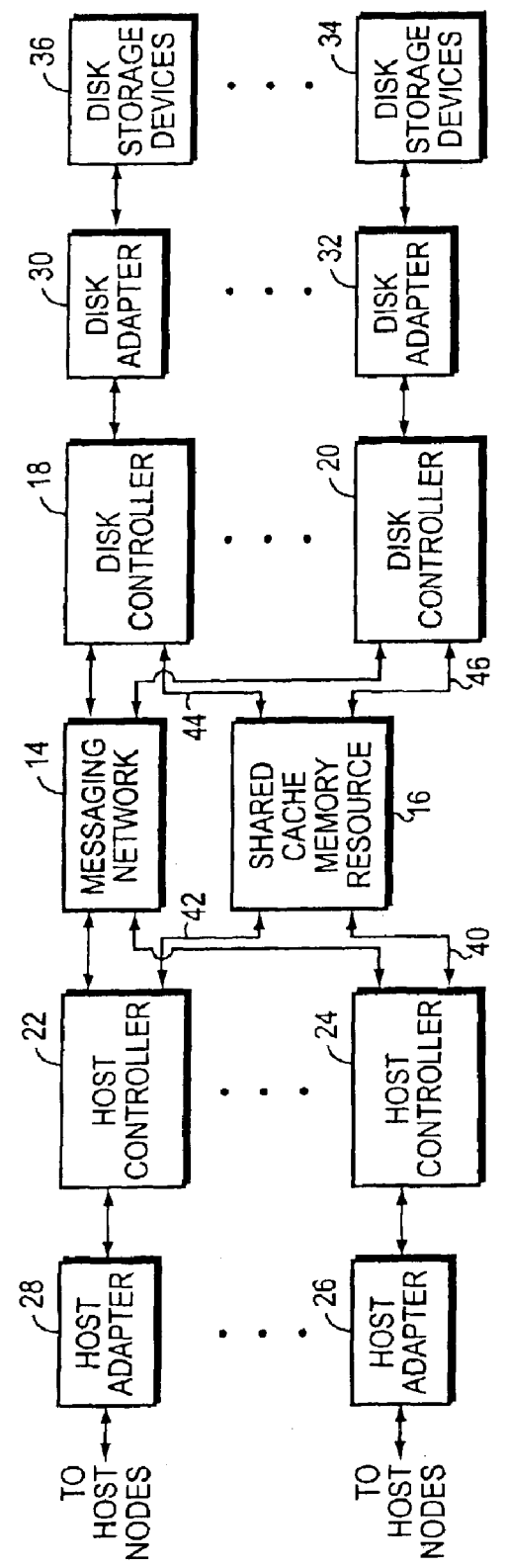
FIG. 2 is a high-level schematic block diagram illustrating functional components of the data storage system included in the data storage network shown in FIG. 1.

FIG. 2 is a high-level schematic block-diagram of functional components of the system 112. System 112 includes a plurality of host adapters 26 . . . 28, a plurality of host controllers 22 . . . 24, a message network or system 14, a shared cache memory resource 16, a plurality of disk controllers 18 . . . 20, a plurality of disk adapters 30 . . . 32, and sets of disk storage devices 34 . . . 36. In system 112, the host controllers and disk controllers are coupled to individual memory boards (See FIGS. 3 and 4) comprised in the cache memory 16 via a point-to-point data transfer network system that comprises a plurality of network links. For example, host controllers 22 and 24 are coupled to the cache memory resource 16 via respective pluralities of point-to-point data transfer network links 42 and 40 comprised in the point-to-point data transfer network system. Similarly, the disk controllers 18 and 20 are coupled to the cache memory resource 16 via respective pluralities of point-to-point data transfer network links 44 and 46 comprised in the point-to-point data transfer network system.

In this embodiment of system 112, although not shown explicitly in the Figures, depending upon the particular communication protocols being used in the respective links 114, 116, 118, 120, . . . 122, each host adapter 26 . . . 28 may be coupled to multiple respective host nodes. For example, in this embodiment of system 112, if the links 114, 116, 118, 120 are FC communication links, adapter 26 may be coupled to host nodes 124, 126, 128, 130 via links 114, 116, 118, 120, respectively. It should be appreciated that the number of host nodes to which each host adapter 26 . . . 28 may be coupled may vary, depending upon the particular configurations of the host adapters 26 . . . 28, and host controllers 22 . . . 24, without departing from this embodiment of the present invention. In network 110, host adapter 26 provides network communication interfaces via which the host controller 24 may exchange data and commands, via the links 114, 116, 118, 120, with the host nodes 124, 126, 128, 130, respectively.

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of magnetic and/or optical disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may forward a message, via the messaging network 14, to the disk controller (e.g., controller 18) associated with the storage devices 36 within which the requested data is stored, requesting that the disk controller 18 retrieve the requested data into the cache 16.

In response to the message forwarded from the host controller 24, the disk controller 18 may forward via te coupled appropriate commands for causing one or more of the disk devices 36 to retrieve the requested data. In response to such commands, the devices 36 may forward the requested data to the disk controller 18 via the disk adapter 30, and the disk controller 18 may transfer via one or more of the links 44 the requested data for storage in the cache 16. The disk controller 18 may then forward via the network 14 a message advising the host controller 24 that the requested data has been stored in the cache 16.

In response to the message forwarded from the disk controller 18 via the network 14, the host controller 24 may retrieve the requested data from the cache 16 via one or more of the links 40, and may forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially transfer, via one or more of the links 40, the data associated with the request for storage in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Additional details concerning features and operation of system 112 may be found in e.g., commonly-owned, co-pending U.S. patent application Ser. No. 09/745,814 entitled, "Data Storage System Having Crossbar Switch With Multi-Staged Routing," filed Dec. 21, 2000; this co-pending Application is hereby incorporated by reference herein in its entirety.

Figure 3:
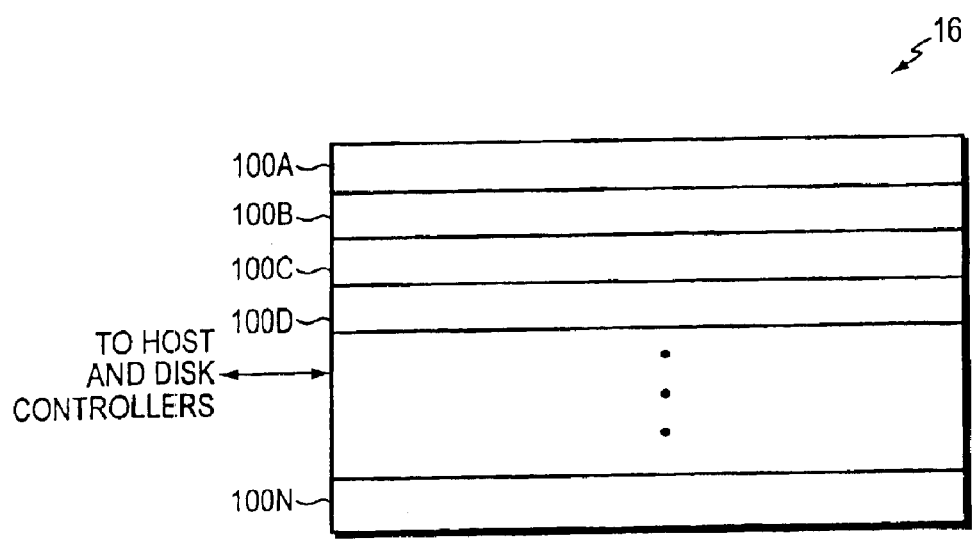
FIG. 3 is a high-level schematic block diagram illustrating functional components of the shared cache memory resource in the data storage system of FIG. 2.
Figure 4:
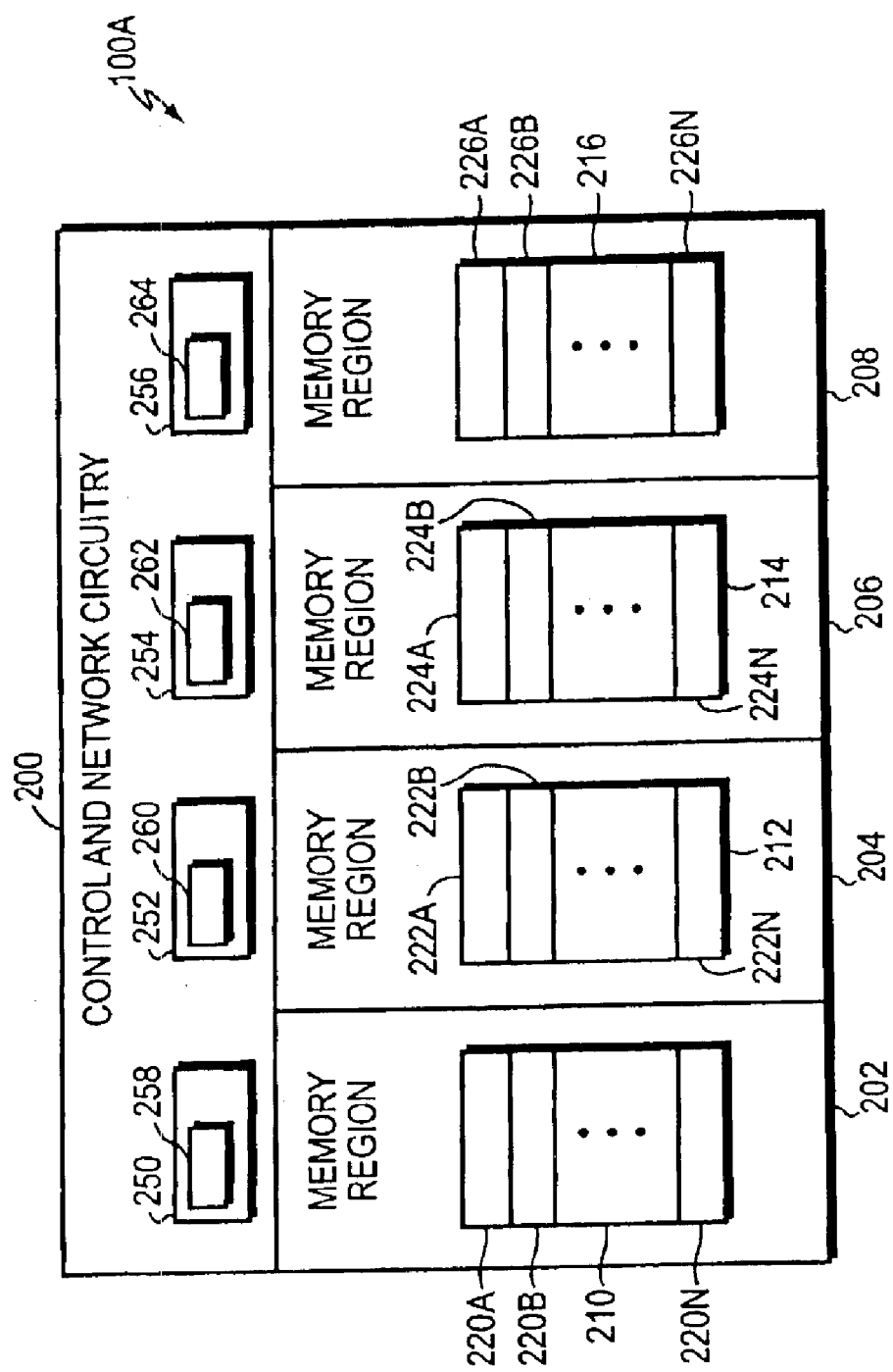
FIG. 4 is a high-level schematic block diagram illustrating functional components of a memory circuit board that may be comprised in the shared cache memory resource of FIG. 3.

With particular reference now being made to FIGS. 3 and 4, memory system 16 comprises a plurality of electrical circuit boards or cards 100A, 100B, 100C, 100D . . . 100N that may be coupled to an electrical backplane (not shown) in system 112. When coupled to this backplane, the memory boards 100A, 100B, 100C, 100D . . . 100N may become electrically connected via electrical circuit traces in the backplane to other components of system 112, such that the boards 100A, 100B, 100C, 100D . . . 100N may communicate and interact with each other and the host and disk controllers in system 112 in the manner described herein. It is important to note that the number of memory boards shown in FIG. 3 is merely illustrative, and depending upon the configuration of the system 112, the actual number of memory boards that may be comprised in the system 112 may vary. The construction and operation of each of the memory boards 100A, 100B, 100C, 100D . . . 100N are essentially identical; accordingly, in order to avoid unnecessary duplication of description, the construction and operation of one memory board 100A are described herein.

FIG. 4 is a high-level logical schematic representation of pertinent functional components of memory board 100A.

Board 100A comprises control and network circuitry 200, and a plurality of memory regions 202, 204, 206, and 208. Each of the memory regions 202, 204, 206, and 208 comprises a respective plurality of banks of SDRAM IC devices. For example, region 202 comprises a plurality of banks of SDRAM IC devices (collectively referred to by numeral 210); region 204 comprises a plurality of banks of SDRAM IC devices 212; region 206 comprises a plurality of banks of SDRAM IC devices 214; and, region 208 comprises a plurality of banks of SDRAM IC devices 216. The respective pluralities of SDRAM IC devices comprised in each of the banks 210, 212, 214, and 216 are configured so as to comprise respective pluralities of memory segments of predetermined size (e.g., 256 megabytes each) in memory system 16. Each of the memory segments may have a different base memory address independent of the other memory segments within the same memory region. More specifically, the SDRAM IC devices in memory banks 210 are configured so as to comprise memory segments 220A, 220B, . . . . 220N; the SDRAM devices in memory banks 212 are devices in memory banks 214 are configured so as to comprise memory segments 224A, 224B, . . . 224N; and, the SDRAM devices in memory banks 216 are configured so as to comprise memory segments 226A, 226B, . . . 226N. It should be noted that the respective number of memory regions comprised in board 100A, as well as, the numbers and sizes of the memory segments comprised in such regions may vary without departing from this embodiment of the present invention. For example, in this embodiment of the present invention, the memory regions may comprise respective integer numbers of memory segments that may vary between 1 and 64, inclusive.

In each respective memory segment, the data stored therein may be further segmented into respective pluralities of 64-bit data words. Individual data words may be grouped into stripe units of 64 words each, and the stripe units may be striped across the respective memory regions in each respective memory board.

It should be appreciated that each of the SDRAM IC devices comprised in the cache 16 is a semiconductor memory device, and these SDRAM IC devices may be used by the cache 16 to store user data forwarded to the cache 16 from the host controllers and the disk controllers in system 112, in accordance with this embodiment of the present invention. Accordingly, the cache memory system 16 is a semiconductor memory system, as distinguished from the disk storage devices 34 . . . 36 comprised in the system 112, and the memory regions and memory segments comprised in the memory system 16 are semiconductor memory regions and semiconductor memory segments, respectively.

In general, control and network circuitry 200 comprises logic network and control logic circuitry that may facilitate, among other things, exchange of data and commands among the memory regions 202, 204, 206, and 208 and the host controllers and disk controllers via the links 40, 42, 44, and 46. More specifically, the control logic circuitry in circuitry 200 may include memory region controller logic sections 250, 252, 254, and 256 that may be associated with and control, among other things, the storing of data in and retrieval of data from the memory regions 202, 204, 206, and 208, respectively. The logic network circuitry in the circuitry 200 may include crossbar switching and associated point-to-point network circuitry (hereinafter referred to as "crossbar switching circuitry") and serial-to-parallel converter circuitry. The serial-to-parallel converter circuitry may be configured to convert serial streams of information (e.g., comprising data, address information, commands, cyclical redundancy check information, signaling semaphores, etc.) received from the host controllers and disk controllers via the links 40, 42, 44, and 46 into corresponding parallel streams of information, and to forward the parallel streams of information to the crossbar switching circuitry. The serial streams of information may also contain "tag" information indicating, among other things, the memory board in the cache 16 and the memory region in that memory board where the data is to be stored/read, the host or disk controller that initiated the data transfer associated with the data, etc. The serial-to-parallel converter circuitry may also be configured to convert parallel streams of information received from the crossbar switching circuitry to corresponding serial streams of information for forwarding to appropriate host and disk controllers via the links 40, 42, 44, and 46 associated with such appropriate controllers.

The crossbar switching circuitry may include a crossbar switch network and an associated point-to-point network. This point-to-point network may include a plurality of point-to-point interconnections or links that may couple respective ports of the crossbar switch network to respective ports comprised in the memory region controller logic sections 250, 252, 254, and 256. The crossbar switch network may be configured to receive the parallel information from the serial-to-parallel converter circuitry, and to forward the received information, based upon the contents of that information, via an appropriate point-to-point interconnection in the point-to-point network in board 100A to a port of an appropriate memory region control logic section (e.g., a memory region control logic section associated with a memory region in board 100A specified in the received parallel information).

Each memory region control logic section may issue commands, responsive to the information that it receives via the point-to-point network in board 100A, to a respective one (e.g., region 202) of the memory regions 202, 204, 206, and 208 with which it is associated. These commands may cause, among other things, the region 202 to store data in the memory banks 210, or to retrieve stored data from the memory banks 210. Such retrieved data may be forward by the memory region control logic section, via the point-to-point network in the board 100A to the crossbar switch network, and thence through the serial-to-parallel converter circuitry, to an appropriate host or disk controller via one of the links 40, 42, 44, and 46.

Each memory region control logic section may issue commands, responsive to the information that it receives via the point-to-point network in board 100A, to a respective one (e.g., region 202) of the memory regions 202, 204, 206, and 208 with which it is associated. These commands may cause, among other things, the region 202 to store data in the memory banks 210, or to retrieve stored data from the memory banks 210. Such retrieved data may be forward by the memory region control logic section, via the point-to-point network in the board 100A to the crossbar switch network, and hence through the serial-to-parallel converter circuitry, to an appropriate host or disk controller via one of the links 40, 42, 44, and 46.

Although not shown in Figures, it should be noted that, in actual implementation of board 100A, portions of the circuitry 200 may be distributed in the regions 202, 204, 206, and 208 (e.g., circuitry for providing relatively low level commands/signals to actual SDRAM IC devices in the region, such as, chip select, clock synchronization, memory addressing, data transfer, memory control/management, clock enable signals, etc.), however, for purposes of the present discussion, this circuitry may be thought of as being logically comprised in the circuitry 200. Further details and description of the types and functions of circuitry 200 that may be distributed in the regions 202, 204, 206, and 208 in actual implementation of board 100A may be found in e.g., commonly-owned, co-pending U.S. patent application Ser. No. 09/796,259, filed Feb. 28, 2001, entitled "Error Condition Handling"; said co-pending Application is hereby incorporated herein by reference in its entirety.

Portions of the respective control and network circuitry of the respective memory boards 100A, 100B, 100C, 100D . . . . 100N may be embodied as application specific integrated circuits (and related circuitry) that may be pre-programmed with specific algorithms whose execution may permit the respective control and network circuitry to be able to carry out the procedures, processes, techniques, operations, and functions that are described above as being carried by such control and network circuitry.

With particular reference now being made to FIGS. 4–9, illustrative embodiments of the present invention will be described. In accordance with this embodiment of the present invention, each of the memory region control logic sections 250, 252, 254, and 256 may comprise one or more, and preferably a plurality of, respective logic sections 258, 260, 262, and 264. More specifically, each of the memory region control logic sections 250, 252, 254, and 256 may include a respective plurality 258, 260, 262, and 264 of different types of logic sections 400, 500, 600, 700, and 800 that may be used by the control logic sections 250, 252, 254, 256 to facilitate the execution, during respective data transfer cycles of the cache memory board 100A, of respective different types of relatively complex atomic read-write-modify operations in accordance with this embodiment of the present invention.

Each memory region controller in the control logic sections 250, 252, 254, and 256 may comprise a respective replicated group of logic sections 400, 500, 600, 700, and 800. Thus, for example, if control logic section 250 includes two memory region controllers, then the plurality of logic sections 258 may comprise two replicated groups of logic sections 400, 500, 600, 700, and 800; one of these two replicated groups of logic sections 400, 500, 600, 700, and 800 may be comprised in one of the two memory region controllers in control logic section 250, and the other of these two replicated groups of logic sections 400, 500, 600, 700, and 800 may be comprised in the other of the two memory region controllers in control logic section 250. Among these replicated groups of logic sections 400, 500, 600, 700, and 800, the function and operation of logic sections 400, 500, 600, 700, and 800 of the same respective type are substantially identical; accordingly, in order to avoid unnecessary duplication of description, the function and operation of only one replicated group of logic sections 400, 500, 600, 700, and 800 in control logic 250 will be described herein.

Figure 5:
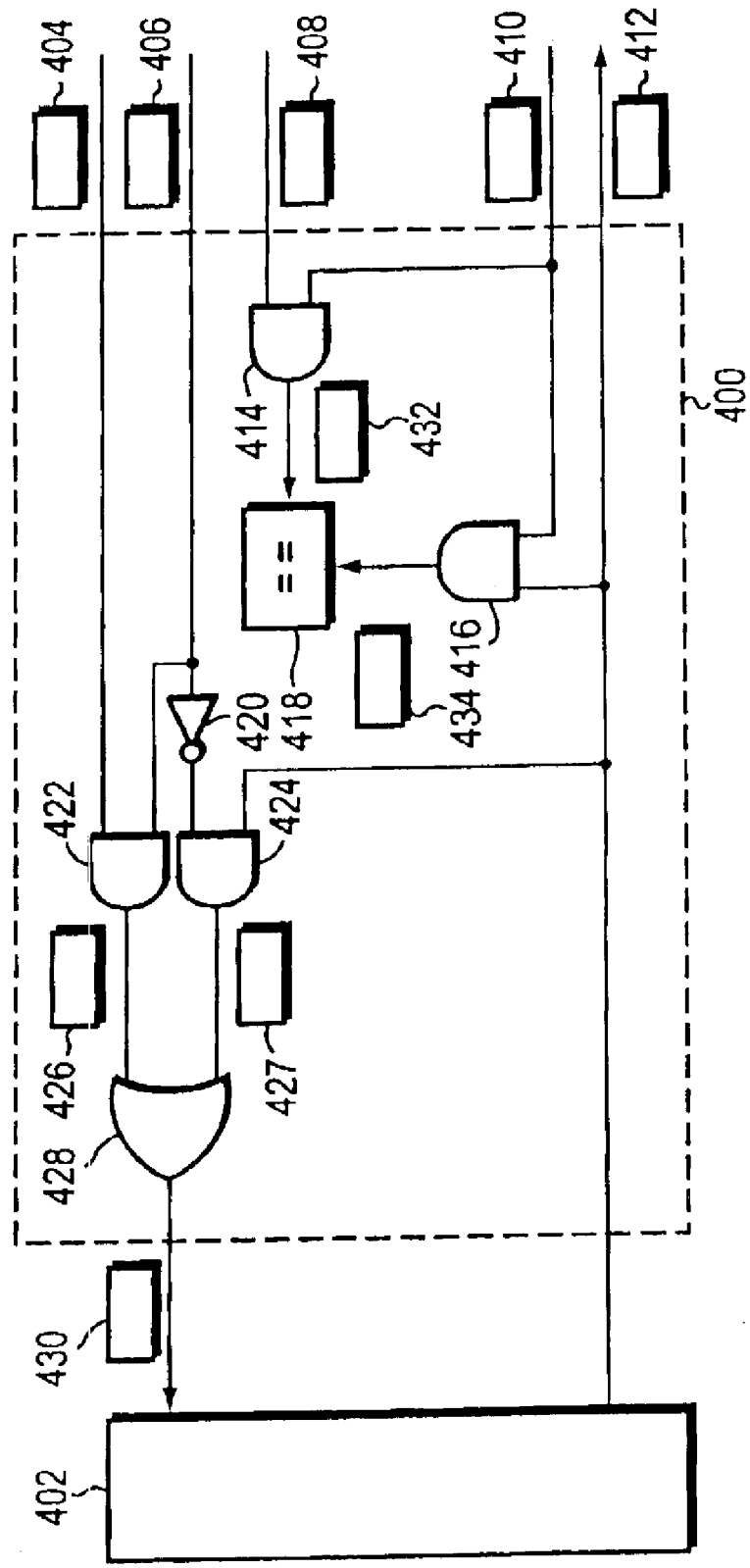
FIGS. 5 to 9 are high-level schematic block diagrams illustrating functional components of respective logic sections that may be comprised in the memory circuit board of FIG. 4.

FIG. 5 is a high-level logical schematic diagram illustrating functional components of one logic section 400 that may be comprised in the plurality of logic sections 258. In operation, in general, this logic section 400 may perform a respective set of operations comprised in a first type of relatively complex atomic read-modify-write memory operation according to this embodiment of the present invention (hereinafter termed "the first read-modify-write operation"). As stated previously, the memory region 202 may include a plurality of addressable data word storage locations. The logic section 400 of FIG. 5 may receive data words read by the control logic 250 from these storage locations in region 202, and may provide to the control logic 250 data words to be written by the control logic 250 to such locations. In order to facilitate description of the construction and operation of the logic section 400 of FIG. 5, one such data word storage location 402 in memory region 202 is illustrated symbolically in FIG. 5.

The logic section 400 of FIG. 5 comprises AND logic sections 414, 416, 422, and 424, inverter logic section 420, OR logic section 428, and comparator/control logic section 418. In operation of the logic section 400 of FIG. 5, during a single respective data transfer cycle of the memory board 100A in memory system 16, the logic section 400 of FIG. 5 may perform a plurality of operations comprised in a respective execution of the first read-modify-write operation. In general, a respective execution of the first data read-modify-write operation takes place entirely during a respective data transfer cycle of the memory board 100A; during a respective execution of the first read-modify-write operation, the logic section 400 of FIG. 5 may receive four respective data words (e.g., data words 404, 406, 408, and 410) forwarded to the control logic 250 from a host/disk controller (e.g., disk controller 18) via the serial-to-parallel converter and crossbar switching circuitry in circuitry 200, may perform the aforesaid plurality of operations necessary to carry out the respective execution of the first read-modify-write operation, and may forward to that controller 18, via the serial-to-parallel converter and crossbar switching circuitry 200, a respective data word (e.g., data word 412) read by control logic 250 from a memory location (e.g., data word storage location 402) in region 202. Also, as will be described more fully below, depending upon the results of the aforesaid plurality of operations performed by the logic section 400 of FIG. 5, a respective execution of the first read-modify-write operation may also include the overwriting, by the control logic 250, during this respective data transfer cycle, of the contents of the memory location 402 (i.e., the data word 412) with a new data word 430 generated by the logic section 400 of FIG. 5.

More specifically, during a respective execution of the first read-modify-write operation, the following operations comprised in the respective execution of the first read-modify-write operation may be performed by the logic section 400 of FIG. 5 and the control logic 250. AND logic 422 may perform a bit-wise logical AND of respective data words 404 and 406 from the controller 18 in order to generate respective data word 426; AND logic 414 may perform a bit-wise logical AND of respective data words 408 and 410 in order to generate respective data word 432; AND logic 416 may perform a bit-wise logical AND of respective data words 410 and 412 in order to generate respective data word 434; AND logic 424 may perform a bit-wise logical AND of respective data word 412 and an inversion of the respective data word 406 (i.e., provided by inverter 420) in order to generate respective data word 427. OR logic 428 may perform a bit-wise logical OR of the respective data words 426 and 427 in order to generate the respective data word 430. Compare/control logic 418 may perform a bit-wise comparison of the respective data words 432 and 434. If the logic 418 determines that these data words 432 and 434 exactly match each other, the logic 418 may cause the memory region control logic 250 to overwrite the contents of the memory location 402 (i.e., data word 412) with the data word 430; conversely, if the logic 418 determines that the data words 432 and 434 do not exactly match each other, the data word 430 may not be written to the memory location 402.

As can be ascertained from the above description of the operation of the logic section 400 of FIG. 5, AND logic sections 414 and 416 essentially constitute masking logic that may be used to mask the respective values of the respective data words 412 and 408 with the value of data word 410, and the respective data words 414 and 416 that may result from this masking of the data words 412 and 408 may be supplied to the comparison logic 418 for use in determining whether the respective data word 430 is to be written to the memory location 402. Thus, in the operation of the logic section 400 of FIG. 5, the respective data word 410 may be thought of as constituting a "comparison mask" data word that may be selected by the controller 18.

As also can be ascertained from the above description of the operation of the logic section 400 of FIG. 5, AND logic sections 422 and 424, OR logic 428, and inverter 420, may be thought of as together essentially constituting masking logic that may be used to generate the respective data word 430 based upon the respective data words 404, 406, and 412, with the respective data word 406 constituting a mask data word. More specifically, this masking logic may generate the respective data word 430 such that, for each respective bit in the respective mask data word 406 that is set equal to a logic "1," the data word 430 may be generated by replacing a respective corresponding bit in the respective data word 412 with the respective value of the respective corresponding bit from the respective data word 404. Thus, by appropriately selecting the value of the respective data word 406, the controller 18 may select one or more portions of the respective data word 412 that may be replaced with one or more corresponding portions from the respective data word 404, to generate the respective data word 430.

Figure 6:
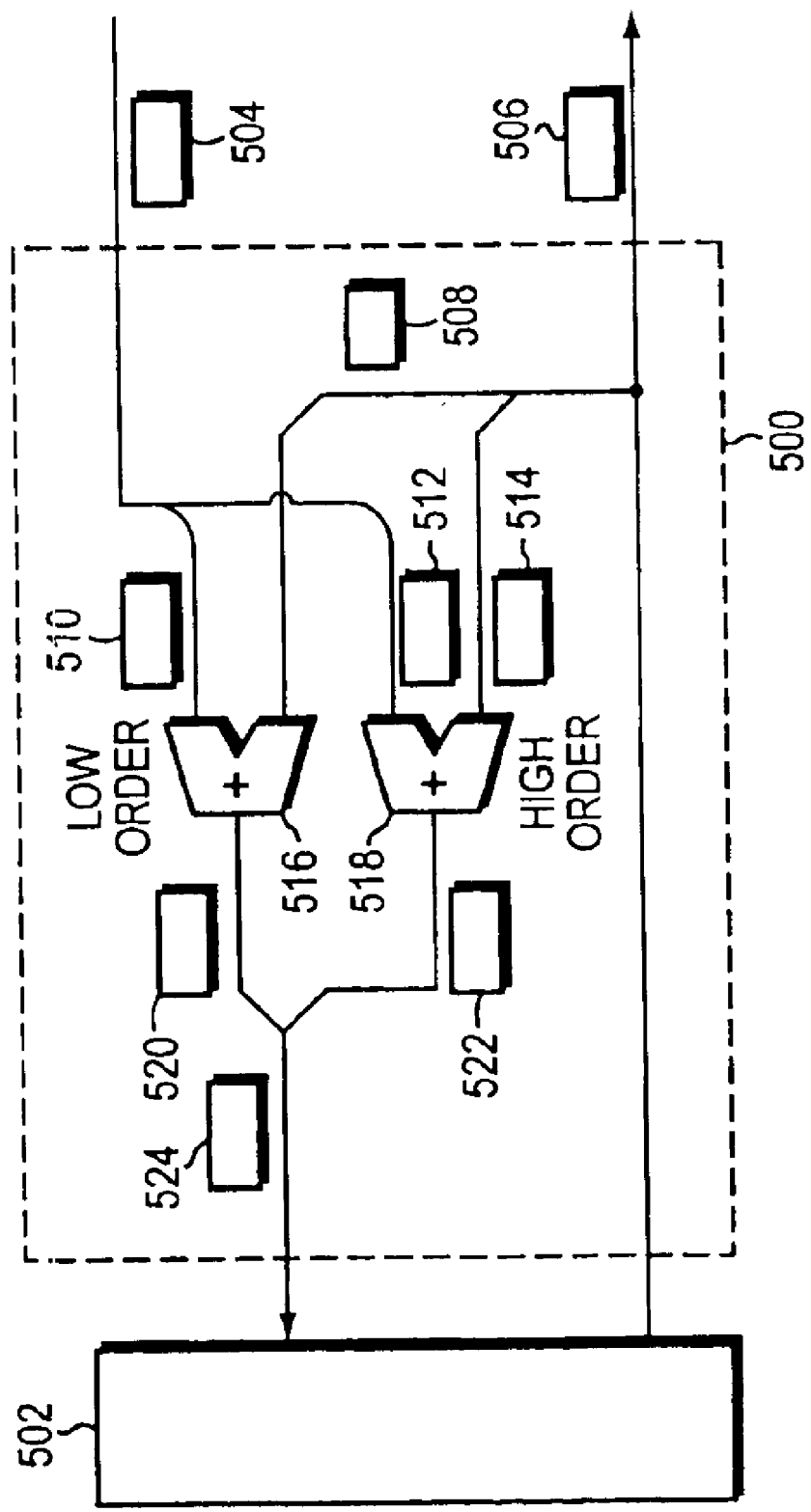

FIG. 6 is a high-level logical schematic diagram illustrating functional components of another logic section 500 that may be comprised in the plurality of logic sections 258. In operation, in general, this logic section 500 may perform a respective set of arithmetic operations comprised in a second type of relatively complex atomic read-modify-write memory operation according to this embodiment of the present invention (hereinafter termed "the second read-modify-write operation"). As stated previously, the memory region 202 may include a plurality of addressable data word storage locations. The logic section 500 of FIG. 6 may receive data words read by the control logic 250 from these storage locations in region 202, and may provide to the control logic 250 data words to be written to such locations by the control logic 250. In order to facilitate description of the construction and operation of the logic section 500 of FIG. 6, one such data word storage location 502 in memory region 202 is illustrated symbolically in FIG. 6.

The logic section 500 of FIG. 6 may comprise addition logic sections 516 and 518. In operation of the logic section 500 of FIG. 6, during a single respective data transfer cycle of the memory board 100A in memory system 16, the addition logic sections 516 and 518 may perform respective arithmetic (i.e., addition) operations comprised in a respective execution of the second read-modify-write operation. In general, a respective execution of the second read-modify-write operation takes place entirely during a respective data transfer cycle of the memory board 100A; a respective execution of the second read-modify-write operation comprises the receipt by the logic section 500 of FIG. 6 of one respective data word (e.g., data word 504) forwarded to the control logic 250 from a host/disk controller (e.g., disk controller 18) via the serial-to-parallel converter and crossbar switching circuitry in circuitry 200, and the forwarding by the logic section 500 of FIG. 6 to that controller 18, via the serial-to-parallel converter and crossbar switching circuitry in circuitry 200, of a respective data word (e.g., data word 506) read by control logic 250 from a memory location (e.g., data word storage location 502) in region 202. Also, during a respective execution of the second read-modify-write operation, the control logic 250 may overwrite the previous contents of the memory location 502 (i.e., the data word 506) with a new data word 524 generated by the logic section 500 of FIG. 6.

More specifically, during a respective execution of the second read-modify-write operation, the following operations comprised in the respective execution of the second read-modify-write operation may be performed by the logic section 500 of FIG. 6 and the control logic 250. The logic section 500 of FIG. 6 may supply, as inputs to addition logic sections 518 and 516, respectively, a respective high order half-word 512 and a respective low order half-word 510 of the respective data word 504. That is, assuming that the respective data word 504 is a 64-bit value, the respective half-word 512 that may be supplied to the addition logic 518 may comprise the high order 32 bits of the respective data word 504, and the respective half-word 510 that may be supplied to the addition logic 516 may comprise the low order 32 bits of the respective data word 504, respectively. The logic section 500 of FIG. 6 also may supply, as inputs to addition logic sections 518 and 516, respectively, a respective high order half-word 514 and a respective low order half-word 508 from the respective data word 506 read from the memory location 502. That is, assuming that the respective data word 506 is a 64-bit value, the respective half-word 514 that may be supplied to the addition logic 518 may comprise the high order 32 bits of the respective data word 506, and the half-word 508 that may be supplied to the addition logic 516 may comprise the low order 32 bits of the respective data word 506, respectively. The addition logic 516 may unconditionally sum together, using an unsigned addition operation, the two low order half-words 508 and 510, to generate a resulting 32-bit summation half-word 520; the addition logic 516 may be configured to discard any carry bit resulting from this unsigned addition operation. Similarly, the addition logic 518 may unconditionally sum together, using an unsigned addition operation, the two high order half-words 512 and 514, to generate a resulting 32 bit summation half-word 522; the addition logic 518 may be configured to discard any carry bit resulting from this unsigned addition operation. The logic section 500 in FIG. 6 may then concatenate the two half-words 522 and 520 such that, in the 64-bit data word 524 that results from this concatenation, the high order 32 bits may comprise the half-word 522, and the low order 32 bits may comprise the half-word 520, respectively. The data word 524 may be supplied to the control logic 250, and the control logic 250 may overwrite the contents of the memory location 502 (i.e., data word 506) with the data word 524.

Figure 7:
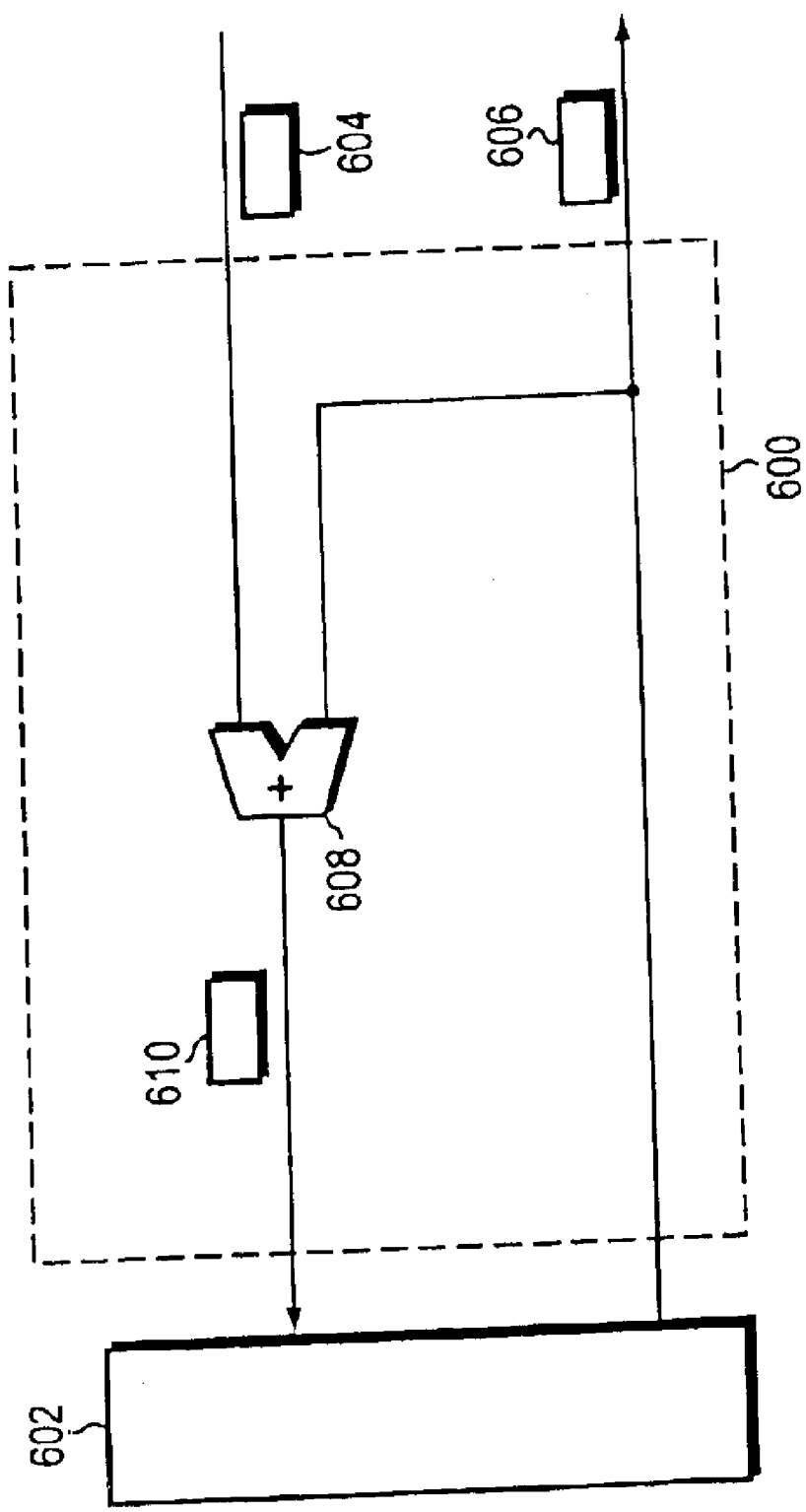

FIG. 7 is a high-level logical schematic diagram illustrating functional components of another logic section 600 that may be comprised in the plurality of logic sections 258. In operation, in general, this logic section 600 may perform a respective set of operations comprised in a third type of relatively complex atomic read-modify-write memory operation according to this embodiment of the present invention (hereinafter termed "the third read-modify-write operation"). As stated previously, the memory region 202 may include a plurality of addressable data word storage locations. The logic section 600 of FIG. 7 may receive data words read by the control logic 250 from these storage locations in region 202, and may provide to the control logic 250 data words to be written to such locations by the control logic 250. In order to facilitate description of the construction and operation of the logic section 600 of FIG. 7, one such data word storage location 602 in memory region 202 is illustrated symbolically in FIG. 7.

The logic section 600 of FIG. 7 comprises an addition logic section 608. In operation of the logic section 600 of FIG. 7, during a single respective data transfer cycle of the memory board 100A in memory system 16, the addition logic section 608 may perform a respective arithmetic (i.e., addition) operation comprised in a respective execution of the third read-modify-write operation. In general, a respective execution of the third read-modify-write operation takes place entirely during a respective data transfer cycle of the memory board 100A; during a respective execution of the third read-modify-write operation, the logic section 600 of FIG. 7 may receive one respective data word (e.g., data word 604) forwarded to the control logic 250 from a host/disk controller (e.g., disk controller 18) via the serial-to-parallel converter and crossbar switching circuitry in memory board 100A, and may forward to that controller 18, via the serial-to-parallel converter and crossbar switching circuitry in memory board 100A, a respective data word (e.g., data word 606) read by control logic 250 from a memory location (e.g., data word storage location 602) in region 202. Also, during a respective execution of the third read-modify-write operation, the control logic 250 may overwrite the previous contents of the memory location 602 (i.e., the data word 606) with a new data word 610 generated by the logic section 600 of FIG. 7.

More specifically, during a respective execution of the third read-modify-write operation, the following operations comprised in the respective execution of the third read-modify-write operation may be performed by the logic section 600 of FIG. 7 and the control logic 250. The logic section 600 of FIG. 7 may supply, as inputs to addition logic section 608 the complete 64-bit data word 604 and the complete 64-bit data word 606. The addition logic 608 may unconditionally sum together, using an unsigned addition operation, the two respective data words 604 and 606, to generate a resulting 64 bit summation data word 610; the addition logic 608 may be configured to discard any carry bit resulting from this unsigned addition operation. The data word 610 may be supplied to the control logic 250, and the control logic 250 may overwrite the contents of the memory location 602 (i.e., data word 606) with the data word 610.

Figure 8:
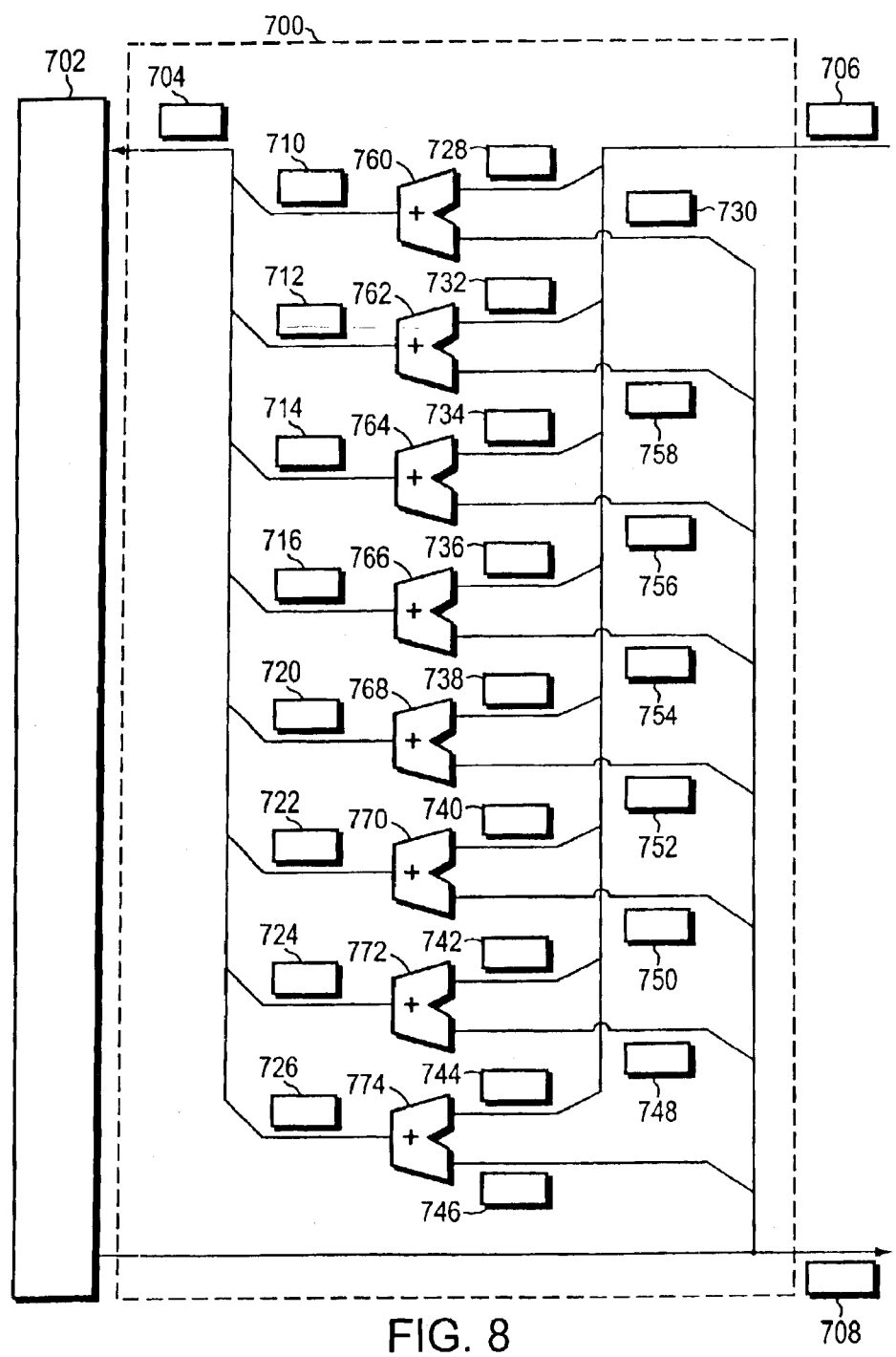

FIG. 8 is a high-level logical schematic diagram illustrating functional components of another logic section 700 that may be comprised in the plurality of logic sections 258. In operation, in general, this logic section 700 may perform a respective set of operations comprised in a fourth type of relatively complex atomic read-modify-write memory operation according to this embodiment of the present invention (hereinafter termed "the fourth read-modify-write operation"). As stated previously, the memory region 202 may include a plurality of addressable data word storage locations. The logic section 700 of FIG. 8 may receive data words read by the control logic 250 from these storage locations in region 202, and may provide to the control logic 250 data words to be written to such locations by the control logic 250. In order to facilitate description of the construction and operation of the logic section 700 of FIG. 8, one such data word storage location 702 in memory region 202 is illustrated symbolically in FIG. 8.

The logic section 700 of FIG. 8 comprises addition logic sections 760, 762, 764, 766, 768, 770, 772, and 774. In operation of the logic section 700 of FIG. 8, during a single respective data transfer cycle of the memory board 100A in memory system 16, the addition logic sections 760, 762, 764, 766, 768, 770, 772, and 774 may perform respective arithmetic (i.e., addition) operations comprised in a respective execution of the fourth read-modify-write operation. In general, a respective execution of the fourth read-modify-write operation takes place entirely during a respective data transfer cycle of the memory board 100A; during a respective execution of the fourth read-modify-write operation, the logic section 700 of FIG. 8 may receive one respective data word (e.g., data word 706) forwarded to the control logic 250 from a host/disk controller (e.g., disk controller 18) via the serial-to-parallel converter and crossbar switching circuitry in memory board 100A, and may forward to that controller 18, via the serial-to-parallel converter and crossbar switching circuitry in memory board 100A, a respective data word (e.g., data word 708) read by control logic 250 from a memory location (e.g., data word storage location 702) in region 202. Also, during a respective execution of the fourth read-modify-write operation, the control logic 250 may overwrite the previous contents of the memory location 702 (i.e., the data word 708) with a new data word 704 generated by the logic section 700 of FIG. 8.

More specifically, during a respective execution of the fourth read-modify-write operation, the following operations comprised in the fourth read-modify-write operation may be performed by the logic section 700 of FIG. 8 and the control logic 250. The logic section 700 of FIG. 8 may supply, as inputs to addition logic sections 760, 762, 764, 766, 768, 770, 772, and 774, respectively, respective bytes 728, 732, 734, 736, 738, 740, 742, and 744, of progressively increasing respective orders, from the respective data word 706. That is, assuming that the respective data word 706 is a 64-bit value, the lowest order byte 728 of the respective data word 706 may be supplied to the addition logic 760, the second lowest order byte 732 of the respective data word 706 may be supplied to the addition logic 762, the third lowest order byte 734 of the respective data word 706 may be supplied to the addition logic 764, the fourth lowest order byte 736 of the respective data word 706 may be supplied to the addition logic 766, the fifth lowest order byte 738 of the respective data word 706 may be supplied to the addition logic 768, the sixth lowest order byte 740 of the respective data word 706 may be supplied to the addition logic 770, the seventh lowest order byte 742 of the respective data word 706 may be supplied to the addition logic 772, and the highest order byte 744 of the respective data word 706 may be supplied to the addition logic 774.

The logic section 700 of FIG. 8 also may supply, as inputs to addition logic sections 760, 762, 764, 766, 768, 770, 772, and 774, respectively, respective bytes 730, 758, 756, 754, 752, 750, 748, and 746 of progressively increasing respective orders, from the respective data word 708. That is, assuming that the respective data word 708 is a 64-bit value, the lowest order byte 730 of the respective data word 708 may be supplied to the addition logic 760, the second lowest order byte 758 of the respective data word 708 may be supplied to the addition logic 762, the third lowest order byte 756 of the respective data word 708 may be supplied to the addition logic 764, the fourth lowest order byte 754 of the respective data word 708 may be supplied to the addition logic 766, the fifth lowest order byte 752 of the respective data word 708 may be supplied to the addition logic 768, the sixth lowest order byte 750 of the respective data word 708 may be supplied to the addition logic 770, the seventh lowest order byte 748 of the respective data word 708 may be supplied to the addition logic 772, and the highest order byte 746 of the respective data word 708 may be supplied to the addition logic 774.

Each respective addition logic section 760, 762, 764, 766, 768, 770, 772, and 774 may unconditionally sum together, using a respective unsigned addition operation, the two respective bytes supplied to the respective addition logic section, to generate respective resulting summation bytes 710, 712, 714, 716, 720, 722, 724, and 726; the addition logic sections 760, 762, 764, 766, 768, 770, 772, and 774 may be configured to discard any carry bits resulting from these unsigned addition operations. The logic section 700 in FIG. 8 may then concatenate the respective summation bytes 710, 712, 714, 716, 720, 722, 724, and 726 such that, in the 64-bit data word 704 that results from this concatenation, the lowest order byte of the respective data word 704 may be the byte 710, the second lowest order byte of the respective data word 704 may be the byte 712, the third lowest order byte of the respective data word 704 may be the byte 714, the fourth lowest order byte of the respective data word 704 may be the byte 716, the fifth lowest order byte of the respective data word 704 may be the byte 720, the sixth lowest order byte of the respective data word 704 may be the byte 722, the seventh lowest order byte of the respective data word 704 may be the byte 724, and the highest order byte of the respective data word 704 may be the byte 726, respectively. The data word 704 may be supplied to the control logic 250, and the control logic 250 may overwrite the contents of the memory location 702 (i.e., data word 708) with the data word 704.

Figure 9:
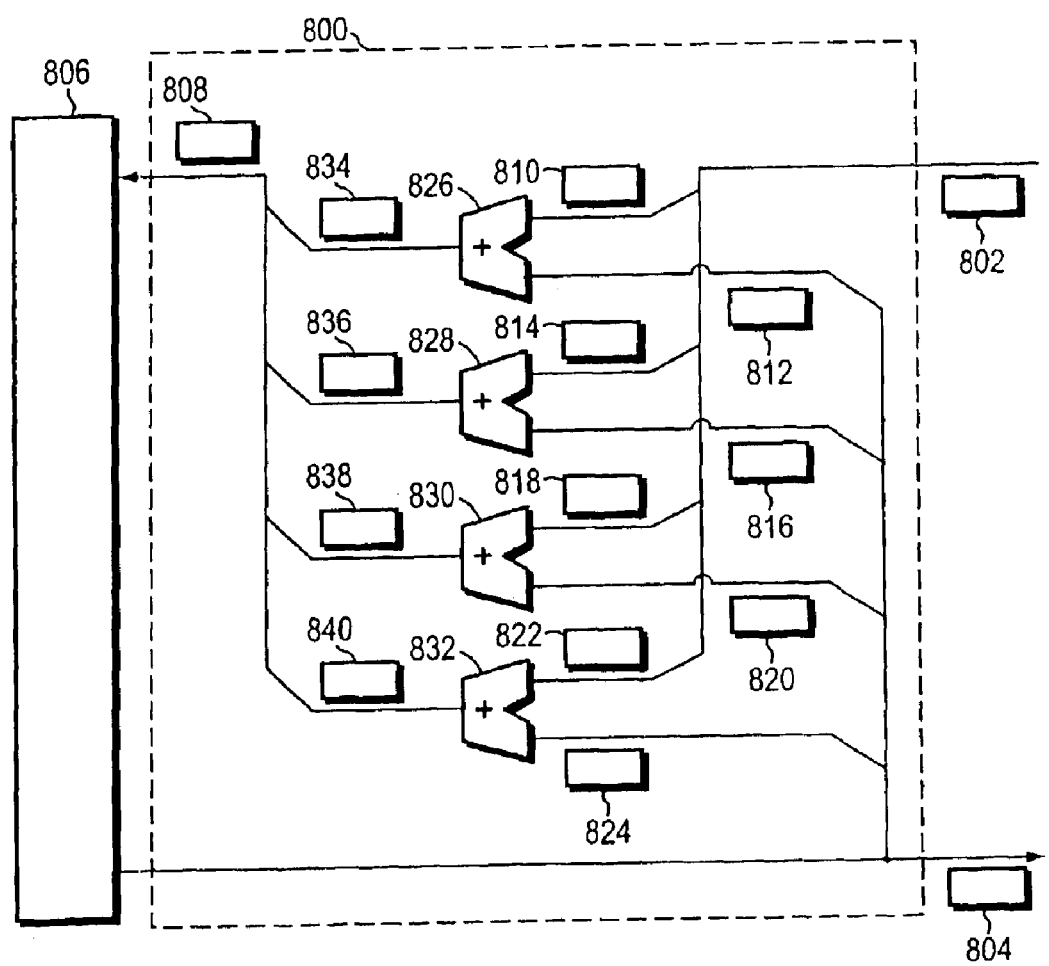

FIG. 9 is a high-level logical schematic diagram illustrating functional components of another logic section 800 that may be comprised in the plurality of logic sections 258. In operation, in general, this logic section 800 may perform a respective set of operations comprised in a fifth type of relatively complex atomic read-modify-write memory operation according to this embodiment of the present invention (hereinafter termed "the fifth read-modify-write operation"). As stated previously, the memory region 202 may include a plurality of addressable data word storage locations. The logic section 800 of FIG. 9 may receive data words read by the control logic 250 from these storage locations in region 202, and may provide to the control logic 250 data words to be written to such locations by the control logic 250. In order to facilitate description of the construction and operation of the logic section 800 of FIG. 9, one such data word storage location 806 in memory region 202 is illustrated symbolically in FIG. 9.

The logic section 800 of FIG. 9 comprises addition logic sections 826, 828, 830, and 832. In operation of the logic section 800 of FIG. 9, during a single respective data transfer cycle of the memory board 100A in memory system 16, the addition logic sections 826, 828, 830, and 832 may perform respective arithmetic (i.e., addition) operations comprised in a respective execution of the fifth read-modify-write operation. In general, a respective execution of the fifth read-modify-write operation takes place entirely during a respective data transfer cycle of the memory board 100A; during a respective execution of the fifth read-modify-write operation, the logic section 800 of FIG. 9 may receive one respective data word (e.g., data word 802) forwarded to the control logic 250 from a host/disk controller (e.g., disk controller 18) via the serial-to-parallel converter and crossbar switching circuitry in memory board 100A, and may forward to that controller 18, via the serial-to-parallel converter and crossbar switching circuitry in memory board 100A, a respective data word (e.g., data word 804) read by control logic 250 from a memory location (e.g., data word storage location 806) in region 202. Also, during a respective execution of the fifth read-modify-write operation, the control logic 250 may overwrite the previous contents of the memory location 806 (i.e., the data word 804) with a new data word 808 generated by the logic section 800 of FIG. 9.

More specifically, during a respective execution of the fifth read-modify-write operation, the following operations comprised in the respective execution of the fifth read-modify-write operation may be performed by the logic section 800 of FIG. 9. The logic section 800 of FIG. 9 may supply, as inputs to addition logic sections 826, 828, 830, and 832, respectively, respective 16-bit terms Hereinafter termed "double bytes") 810, 814, 818, and 822, of progressively increasing respective orders, from the respective data word 802. That is, assuming that the respective data word 802 is a 64-bit value, the lowest order double byte 810 of the respective data word 802 may be supplied to the addition logic 826, the second lowest order double byte 814 of the respective data word 802 may be supplied to the addition logic 828, the third lowest order double byte 818 of the respective data word 802 may be supplied to the addition logic 830, and the highest order double byte 822 of the respective data word 802 may be supplied to the addition logic 832.

The logic section 800 of FIG. 9 also may supply, as inputs to addition logic sections 826, 828, 830, and 832, respectively, respective double bytes 812, 816, 820, and 824, of progressively increasing respective orders, from the respective data word 804. That is, assuming that the respective data word 804 is a 64-bit value, the lowest order double byte 812 of the respective data word 804 may be supplied to the addition logic 826, the second lowest order double byte 816 of the respective data word 804 may be supplied to the addition logic 828, the third lowest order double byte 820 of the respective data word 804 may be supplied to the addition logic 830, and the highest order double byte 824 of the respective data word 804 may be supplied to the addition logic 832.

Each respective addition logic section 826, 828, 830, and 832 may unconditionally sum together, using a respective unsigned addition operation, the two respective double bytes supplied to the respective addition logic section, to generate respective resulting summation double bytes 834, 836, 838, and 840; the addition logic sections 826, 828, 830, and 832 may be configured to discard any carry bits resulting from these unsigned addition operations. The logic section 800 in FIG. 9 may then concatenate the respective summation double bytes 834, 836, 838, and 840 such that, in the 64-bit data word 808 that results from this concatenation, the lowest order double byte of the respective data word 808 may be the double byte 834, the second lowest order double byte of the respective data word 808 may be the double byte 836, the third lowest order double byte of the respective data word 808 may be the double byte 838, and the highest order double byte of the respective data word 808 may be the double byte 840. The data word 808 may be supplied to the control logic 250, and the control logic 250 may overwrite the contents of the memory location 806 (i.e., data word 804) with the data word 808.

With particular reference now being made to FIGS. 4–9, various operations that may be performed in the memory board 100A during a respective data transfer cycle, in which one of the relatively complex atomic operations of this embodiment of the present invention is executed, will now be described in greater detail. As used in connection with the foregoing description of the construction and operation of the logic sections 400, 500, 600, 700, and 800 of FIGS. 5, 6, 7, 8, and 9, respectively, each respective "data transfer cycle" of the memory board 100A in the cache memory system 16 may consist of four respective phases: a respective address/command phase, a respective data phase, a respective data return phase, and a respective status phase. Each such respective data transfer cycle may be initiated by a respective assertion of a select signal supplied to the control logic 250 by the crossbar switching circuitry in circuitry 200; the respective assertion of the select signal may signify the commencement of the respective address/command phase of the respective data transfer cycle. The crossbar switching circuitry in circuitry 200 may be configured to assert this select signal in response to a command from a host/disk controller in system 112 to the circuitry 200 to perform, using a respective logic section comprised in the logic section 250, a specified one of the atomic read-modify-write memory operations of this embodiment of the present invention. Contemporaneously with the respective assertion of the select signal, the crossbar switching circuitry in circuitry 200 may commence transmission to the control logic 250 of, among other things, respective command, address, and "tag" information for causing the control logic 250 to initiate the execution of the atomic read-modify-write memory operation specified in the command from the host/disk controller.

If, during the respective address/command phase, the control logic section 250 detects the occurrence of an error that is sufficient to necessitate termination of the respective data transfer cycle, the control logic section 250 may assert, one clock cycle after the detection by the section 250 of such an error, an initial status signal that is supplied to the crossbar switching circuitry in circuitry 200 from the control logic section 250; the assertion of the initial status signal may indicate to the crossbar switching circuitry in circuitry 200 that the crossbar switching circuitry's selection (i.e., via the assertion of the select signal) of the control logic 250 was unsuccessful. Conversely, if the control logic section 250 does not detect the occurrence of such an error during the respective address/command phase, the control logic section 250 may assert, six clock cycles after the assertion of the select signal, a memory data grant signal to the crossbar switching circuitry in circuitry 200 that may indicate that the crossbar switching circuitry's selection of the control logic 250 has been successful.

Five clock cycles after the assertion of the memory data grant signal, the respective data phase of the respective data transfer cycle may commence with the respective assertion by the crossbar switching circuitry in circuitry 200 of a crossbar data enable signal that is supplied from the crossbar switching circuitry to the control logic 250; the assertion of this crossbar data enable signal by the crossbar switching circuitry in circuitry 200 may signify that the crossbar switching circuitry is beginning to transmit to the control logic section 250 one or more respective data words to be used in the atomic read-modify-write memory operation commanded by the host/disk controller. Contemporaneously with the assertion by the crossbar switching circuitry in circuitry 200 of the crossbar enable signal, the crossbar switching circuitry may also begin the transmission to the control logic section 250 of the one or more respective data words.

If the atomic read-modify-write operation commanded by the host/disk controller requires the use of the logic section 400 of FIG. 5, then the one or more respective data words that may be transferred to the control logic 250 during the respective data phase may correspond to respective data words 404, 406, 408, and 410. However, if the atomic read-modify-write operation commanded by the host/disk controller requires the use of the logic section 500 of FIG. 6, then the one or more respective data words that may be transferred to the control logic 250 during the respective data phase may correspond to respective data word 504. Conversely, if the atomic read-modify-write operation commanded by the host/disk controller requires the use of the logic section 600 of FIG. 7, then the one or more respective data words that may be transferred to the control logic 250 during the respective data phase may correspond to respective data word 604. Also, conversely, if the atomic read-modify-write operation commanded by the host/disk controller requires the use of the logic section 700 of FIG. 8, then the one or more respective data words that may be transferred to the control logic 250 during the respective data phase may correspond to respective data word 706. However, if the atomic read-modify-write operation commanded by the host/disk controller requires the use of the logic section 800 of FIG. 9, then the one or more respective data words that may be transferred to the control logic 250 during the respective data phase may correspond to respective data word 802. When the crossbar switching circuitry in circuitry 200 completes the transfer of the one or more respective data words to the control logic 250, the crossbar switching circuitry may de-assert the crossbar data enable signal; this event signifies the termination of the respective data phase of the respective data transfer cycle.

Three clock cycles after this data enable signal, the respective data return phase of the respective data transfer cycle may commence with a respective assertion by the control logic 250 of a memory data enable signal that is supplied to the crossbar switching circuitry in circuitry 200; the assertion of this memory data enable signal may signify that a respective data word (e.g., data word 412, 506, 606, 708, or 804, depending upon the particular atomic read-modify-write operation being commanded by the host/disk controller), retrieved from the memory location (e.g., memory location 402, 502, 602, 702, or 806, depending upon the particular atomic read-modify-write operation being commanded by the host/disk controller) in the memory region 202 whose address was specified in the information provided to the control logic 250 during the respective address/command phase, is being transferred from the control logic 250 to the crossbar switching circuitry. Contemporaneously with this assertion of the memory data enable signal by the control logic 250, the control logic 250 may begin transferring to the crossbar switching circuitry in circuitry 200 the respective data word read from this memory location in the memory region 202. It is important to note that prior to the respective data return phase, the control logic 250 may read this respective data word from this memory location, and may present it (i.e., as an input) to the logic section (e.g., logic section 400, 500, 600, 700, or 800 illustrated FIGS. 5, 6, 7, 8, and 9, respectively) that is to be used in performing the atomic read-modify-write operation commanded by the host/disk controller, in order to permit that logic section to be able to perform, prior to the respective return data phrase, its respective operations that are comprised in commanded atomic read-modify-write operation.

No later than four clock cycles after the respective assertion of the memory data enable signal by the control logic section 250, the control logic section 250 may complete the transfer to the crossbar switching circuitry in circuitry 200 of the respective data word read from the addressed memory location, and may de-assert the memory data enable signal, to signify the termination of the respective data return phase. Contemporaneously with the de-assertion of the memory data enable signal, the control logic section 250 may also de-assert the memory data grant signal.

Immediately following the termination of the respective data return phase, the respective status phase of the respective data transfer cycle may commence with the transmission from the control logic 250 to the crossbar switching circuitry in circuitry 200 of tag and status information associated with the atomic read-modify-write operation commanded by the host/disk controller. The status information may indicate e.g., any errors and/or predetermined events of consequence that may have been detected by the control logic 250 during the respective execution of the commanded atomic read-modify-write operation.

Two clock cycles after de-assertion of the memory data enable signal and the memory data grant signal, the control logic section 250 may complete the transfer of the tag and status information, and the respective status phase may terminate. Contemporaneously with the termination of the respective status phase, the respective data transfer cycle may terminate, and the crossbar switching circuitry in circuitry 200 may de-assert the select signal to indicate the termination of the respective data transfer cycle.

It is important to note that the memory system 16 may execute different types of memory operations in response to commands from host and disk controllers, and different types of data transfer cycles may be used to implement such operations. For example, a host/disk controller may command the memory 16 to perform, among other things, relatively simple read/write operations that do not involve one of the relatively complex atomic read-modify-write operations of this embodiment of the present invention; these relatively simple read/write operations may be implemented via respective read/write data transfer cycles that may differ from the read-modify-write data transfer cycle (described above) used in accordance with this embodiment of the present invention.

Thus, it is evident that there has been provided, in accordance with the present invention, a memory system and method of using same that fully satisfy the aims and objectives, and achieve the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed.

For example, although illustrative embodiments of the present invention have been described in connection with use in a network data storage system that comprises a messaging network 14 that facilitates communications between the host controllers and the disk controllers, and a point-to-point data transfer network system that comprises links 40, 42, 44, and 46, if appropriately modified, these embodiments of the present invention may instead be used in connection with other types of network data storage systems, e.g., that utilize a redundant bus system of the type described in commonly-owned, co-pending U.S. patent application Ser. No. 09/796,259, filed Feb. 28, 2001, entitled "Error Condition Handling".

Other modifications are also possible. For example, the memory system 16 may be configured also to implement, in addition to the relatively complex read-modify-write operations of the present invention, relatively simple read-modify-write memory operations of the type used in the Assignee's conventional data storage system. Also, for example, if appropriately modified, the logic sections 258 may also comprise an additional type of logic section (not shown, hereinafter termed "the additional type of logic section") that may be used in executing an additional respective type of atomic read-modify-write memory operation (hereinafter termed "the additional atomic operation"). The construction and operation of this additional type of logic section may be identical to the construction and operation of the logic section 400 of FIG. 5, with the exception that the additional type of logic section may be configured to receive, process, and return respective data words that may be twice the size (i.e., 128 bits) of the respective 64-bit data words received, processed, and returned by the logic section 400 of FIG. 5.

Further modifications are also possible. Accordingly, the present invention should be viewed broadly as encompassing all modifications, variations, alternatives and equivalents as may be encompassed by the hereinafter appended claims.

What is claimed is:

1. A memory system, comprising:
   at least one memory region adapted to store data; and
   a logic section adapted to be used to execute an atomic operation during a data transfer cycle of the memory system, the atomic operation including performing an addition operation involving summing together a first complete data word from the memory region and a second complete data word from a device external to the memory system, the first complete data word being retrieved from the memory region and being received by the logic section during the data transfer cycle, and the second complete data word being received by the logic section from the device during the data transfer cycle, the atomic operation also including transmitting to the device the first complete data word.

2. The memory system of claim 1, wherein the memory system comprises a plurality of memory regions and a plurality of logic sections, each of the logic sections being associated with a respective one of the memory regions.

3. The memory system of claim 2, wherein the memory system comprises at least one electrical circuit, board, and the memory regions and logic sections are comprised in the at least one electrical circuit board.

4. A memory system, comprising:
   at least one memory region adapted to store data; and
   a logic section adapted to be used to execute an atomic operation during a data transfer cycle of the memory system, the atomic operation including performing a plurality of arithmetic operations involving portions of a first data word from the memory region and portions of a second data word from a device external to the memory system, the portions of the first data word being retrieved from the memory region and being received by the logic section during the data transfer cycle, and the portions of the second data word being received by the logic section from the device during the data transfer cycle, the atomic operation also including transmitting to the device the portions of the first data word.

5. A method of using a memory system, the method comprising:
   executing, using a logic section comprised in the memory system, an atomic operation during a data transfer cycle of the memory system, the atomic operation including performing an addition operation involving summing together a first complete data word from a memory region comprised in the memory system and a second complete data word from a device external to the memory system, the first complete data word being retrieved from the memory region and being received by the logic section during the data transfer cycle, the second complete data word being received by the logic section from the device during the data transfer cycle, the atomic operation also including transmitting to the device the first complete data word.

6. The method of claim 5, wherein the memory system comprises a plurality of memory regions and a plurality of logic sections, each of the logic sections being associated with a respective one of the memory regions.

7. The method of claim 5, wherein the memory system comprises at least one electrical circuit board, and the memory regions and logic sections are comprised in the at least one electrical circuit board.

8. A method of using a memory system, the method comprising:

executing, using a logic section, an atomic operation during a data transfer cycle of the memory system, the atomic operation including performing a plurality of arithmetic operations involving portions of a first data word from a memory region comprised in the memory system and portions of a second data word from a device external to the memory system, the portions of the first data word being retrieved from the memory region and being received by the logic section during the data transfer cycle, and the portions of the second data word being received by the logic section from the device during the data transfer cycle, the atomic operation also including transmitting to the device the portions of the first data word.

* * * * *